US005490256A

United States Patent [19]
Mooney et al.

[11] Patent Number: 5,490,256
[45] Date of Patent: Feb. 6, 1996

[54] METHOD AND MECHANISM FOR CALLING 32-BIT FUNCTIONS FROM 16-BIT FUNCTIONS

[75] Inventors: David M. Mooney, Toronto; Kevin A. Stoodley, Richmond Hill, both of Canada

[73] Assignee: International Business Machines Corporation, Armonk, N.Y.

[21] Appl. No.: 301,221

[22] Filed: Sep. 6, 1994

Related U.S. Application Data

[63] Continuation of Ser. No. 43,453, Apr. 6, 1993, abandoned.
[51] Int. Cl.⁶ ............................................. G06F 9/40
[52] U.S. Cl. ........................... 395/375; 364/DIG. 1; 364/DIG. 2
[58] Field of Search .................. 364/DIG. 1 MS File, 364/DIG. 2 MS File; 395/375, 401, 500, 800

[56] References Cited

U.S. PATENT DOCUMENTS

| | | | |
|---|---|---|---|
| 4,297,743 | 10/1981 | Appell et al. | 395/650 |
| 4,445,173 | 4/1984 | Pilat et al. | 395/375 |
| 4,569,018 | 2/1986 | Hummel et al. | 395/425 |
| 4,928,237 | 5/1990 | Bealkowski et al. | 395/400 |
| 5,097,533 | 3/1992 | Burger et al. | 395/500 |
| 5,127,103 | 6/1992 | Hill et al. | 395/575 |
| 5,129,070 | 7/1992 | Dorotte | 395/400 |
| 5,144,551 | 9/1992 | Cepulis | 395/425 |
| 5,146,593 | 9/1992 | Brandle et al. | 395/700 |

OTHER PUBLICATIONS

Intel i486 Processor Programmer's Reference Manual, 1990, Chapters 10 and 21–24.

Mircrprocessors and Programmed Logic, by Kenneth L. Short, 1981, Chapter 6.

*Primary Examiner*—Robert B. Harrell
*Attorney, Agent, or Firm*—Baker, Maxham, Jester & Meador

[57] ABSTRACT

In the field of mixed 16-bit and 32-bit code, a method and mechanism are provided to implement alterations in the dynamic portion of memory containing the data objects used by code in the 16-bit environment so that such data is accessible to code from the 32-bit environment. The code necessary to implement the method is generated automatically by an enhanced compiler on identifying 16-bit linkage in the 32-bit code. Once the data objects in the stack are accesible to the 32-bit code, a function in the 16-bit code can successfully call a function in 32-bit code.

26 Claims, 2 Drawing Sheets

ововiod
METHOD AND MECHANISM FOR CALLING 32-BIT FUNCTIONS FROM 16-BIT FUNCTIONS This application is a file wrapper continuation of U.S. application Ser. No. 08/043,453 filed Apr. 6, 1993, now abandoned.

FIELD OF THE INVENTION

In the field of function call linkage in computer operating systems using both 16-bit and 32-bit programs and functions, the present invention is directed to providing a hardware implemented method and associated mechanism for calling functions in 32-bit code from a program or function in 16-bit code.

The problem addressed by this invention is to provide a generic means for calling 32-bit functions from 16-bit functions so that these calls need not be addressed by having to provide specialised subroutines for individual applications. The solution offered herein is not programming language dependant, but its particular application iS on so-called "Intel 80X86" system architecture, including 80386, 80486 and other processors of this architecture made by Intel, or competitve implementations.

BACKGROUND OF THE INVENTION

The programming environment for early operating system was in 16-bit code. However, it was found that 16-bit code did not deal well with large pieces of data and longer complex programs. The later developed 32-bit code was found to be easier to program in and capable of handling larger programs.

Consequently, due to the increasing complexity of programming and performance demands on operating systems, the tendency has been to migrate toward 32-bit code environments for programming and for the operating system components themselves. One problem with this is that large amounts of 16-bit code still exist without suitable 32-bit code replacements, and without any mechanism inherent in the 16-bit code for correctly calling 32-bit code. For example, in IBM's OS/2 operating system environment, some of the most notable remaining 16-bit code is in the extended services, such as database manager, communications manager, and netbios. A significant amount of user and application code also still exists only in the 16-bit format.

In a uniform code environment, a common coding style for service providers such as the database and communications managers is to have the service user register certain callback functions that are to be called whenever particular events occur.

In the ordinary course, the executing program utilises a dynamic portion of storage known as the stack for storing and accessing all of the dynamic data objects required to implement the program. A procedure activation record or stack frame is allocated from the stack for each procedure, and contains all of the variables declared within the procedure, the parameters with which the procedure was called and a return address of the calling procedure.

In the case of 16-bit code, stack storage is arranged in segments not exceeding 64K bytes, and 16-bit code cannot correctly access data that spans a 64K byte segment boundary. A 16-bit pointer is formated to provide the address of a data object by identifying the segment number and the number of bytes that the beginning of the data object is offset from the beginning of the 64K byte segment in which it is found. This form of pointer is often referred to as "segmented".

One problem in accessing 16-bit data objects through a called 32-bit subroutine arises in the difference in pointer format between the two types of code.

The storage environment for 32-bit code can be created in a very large segment (up to 4 gigabytes in size). The pointers identifying the beginning addresses of data objects within this large segment simply indicate the number of bytes offset from the base of this large segment. Because the base linear address for all 32-bit pointers is zero, these pointers are often described as "linear" or "flat". As 32-bit code makes no provision for recognising the limited 64K byte segments of 16-bit memory, it is clear that 32-bit functions cannot access data objects by reference to the values provided in 16-bit pointers.

Therefore, with the advent of operating systems in the 32-bit environment, problems arise when a 32-bit application registers functions with 16-bit subroutines, such as the service providers described above. When the 16-bit code issues a call to a function in 32-bit code, control within program implementation will not be correctly transferred to the 32-bit code, and without capability of allowing 16-bit code to call 32-bit code, the usefulness of a purely 32-bit compiler in mixed code environments is severely restricted.

A further restriction in the use of a 32-bit compiler in the operating system is that the 16-bit code cannot be recompiled without access to the source code for the 16-bit code program or function.

Generalized solutions have been offered to deal with such matters as the problems raised in a situation where access to an extended address space may be required by systems having different word lengths without the basic addressing system reflecting their physical structure (U.S. Pat. No. 4,493,027—Katz), and memory accesses utilizing different data structures (U.S. Pat. Nos. 5,060,186—Barbagelata, and 4,297,743—Appell).

However, the only solution offered to the present problem of calling from 16-bit code functions to 32-bit code is to provide special assembler "glue" subroutines in 16-bit code for each individual application to perform the "thunk". No automatic solution appears to exist.

SUMMARY OF THE INVENTION

The term "thunk" is a general term referring to the activites that take place in moving from one environment to another in a mixed environment program. In the present application, the term "thunk" is used to denote the specific series of activities (and the hardware recognised mechanisms to affect the activities) that take place to permit the transfer of control between 16 and 32-bit code environments pursuant to compilation of a program or subroutine.

It is an object of the present invention to provide means for recognising that 32-bit code has been called by a 16-bit subroutine and automatically initiating a generic mechanism, originating in the compiler, for enabling correct transfer of control between the different coding environments.

It is also an object of this invention to render the different format of 16-bit code transparent in a 32-bit coding environment.

Accordingly, the present invention provides a method for calling 32bit code from a 16-bit code in a program operating in a computing environment that includes means for mapping addresses between 16 and 32-bit code. The method comprises the computer implemented steps of building a parameter list in the stack compatible with 32-bit calling, translating 16-bit register values in the stack into a form accesible to 32-bit code, and changing the operating mode in association with the stack to 32-bit form. Preferably, the method also includes the step of aligning the beginning of the stack address on the stack to a location corresponding to a multiple of 4 bytes.

According to the present invention, a mechanism is provided in a computing environment that includes means for mapping addresses between 16 and 32-bit code, for enabling calls from 16-bit code to 32-bit code. The mechanism includes a memory stack in which at least one stack frame is allocated for use by the 16-bit code, and a compiler having an enhancement element for generating a thunk code to build a parameter list in the stack compatible with 16-bit code and convert 16-bit register values in the stack into a 32-bit format. Signal means are also provided in the mechanism for activating the enhancement element in the compiler to generate the thunk code. Preferably, the mechanism also includes means for implementing a operating mode in 32-bit format.

DESCRIPTION OF THE PREFERRED EMBODIMENT

Figure 1:
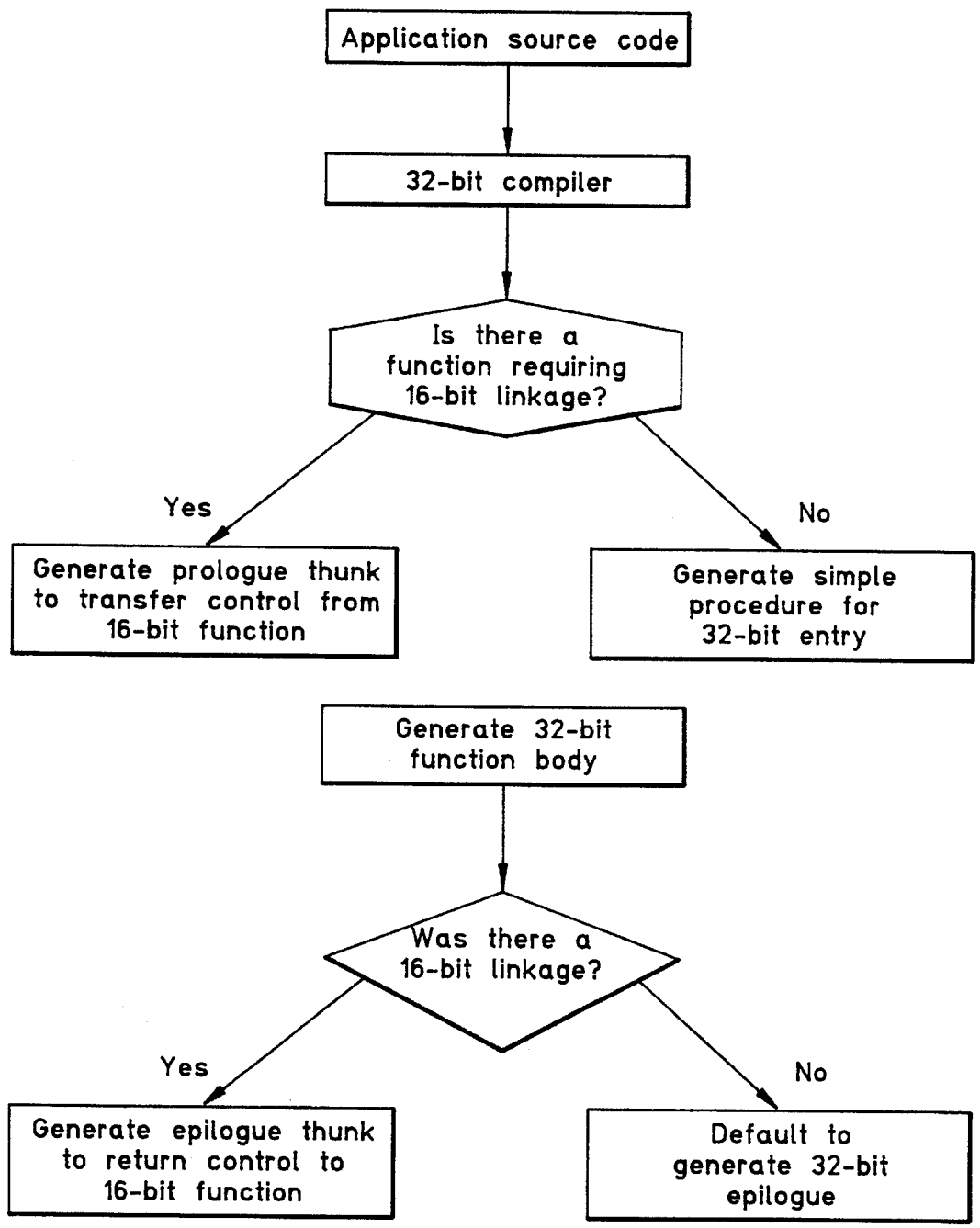
FIG. 1 is a flow chart providing a general outline of the steps taken at compile time for implementing the preferred embodiment of this invention.

As shown in FIG. 1, a service provider, such as a database manager, is called and enters a 32-bit compiler for processing. In the preferred embodiment, the compiler is in fact a 32-bit C language compiler, but as previously stated, the invention is not dependant on programming language format.

An enhancement element added to the compiler causes the compiler to check the incoming code for any 16-bit linkage, that is, a declaration indicating that the service provider was called by a 16-bit program. On locating this, the enhanced compiler automatically adds to the 32-bit function body produced for the service provider itself, additional code for inclusion in the prologue and epilogue of the function body, to perform a thunk and a return after thunk, to enable a smooth transition from the 16-bit code of the caller program to the 32-bit code of the callee, and back again on return of the 32-bit code.

Figure 2:
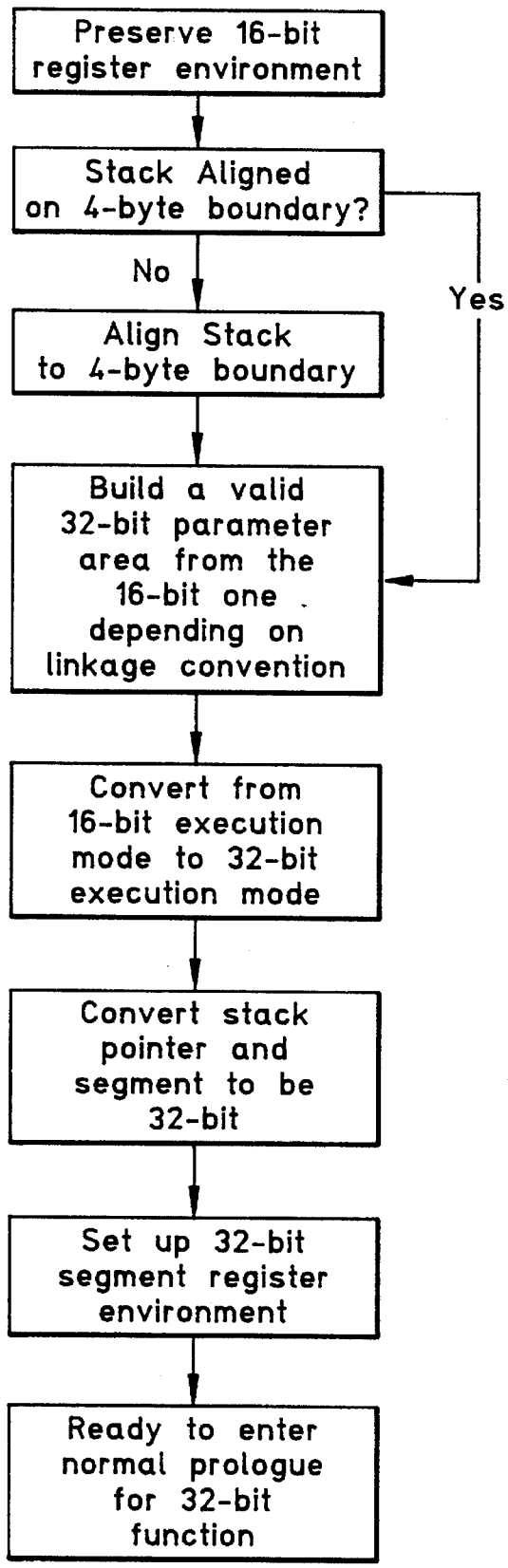
FIG. 2 is a flow chart illustrating the method steps in the prologue code generated by an enhanced compiler to permit transfer of control from 16-bit to 32-bit code, pursuant to the preferred embodiment of this invention.
Figure 3:
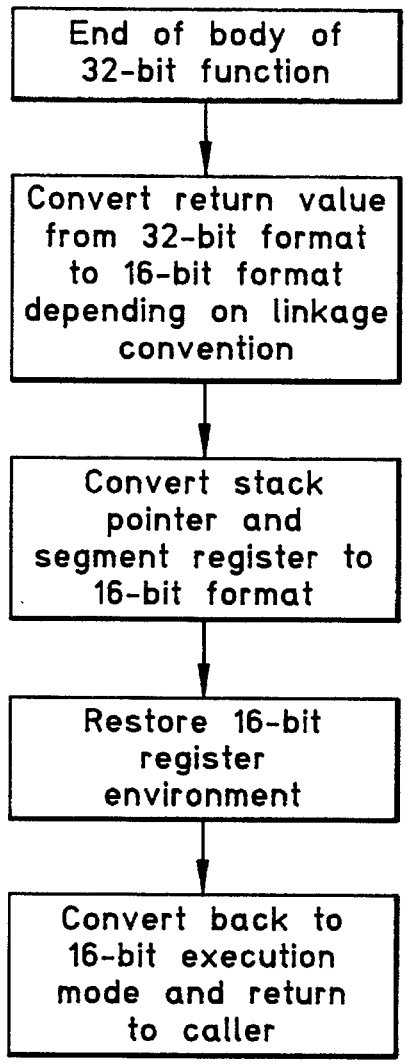
FIG. 3 is a flow chart illustrating the method steps in the epilogue code generated by the enhanced compiler to permit transfer of control back to 16-bit code following implementation of a 32-bit function, pursuant to the preferred embodiment of this invention.

The steps of the prologue and epilogue procedures are separately illustrated in FIGS. 2 and 3, respectively.

As shown in FIG. 1, the compiler must actually look for the 16-bit linkage, or at least an indication that it has found a 16-bit linkage in the 32-bit code, twice, both before and after processing the function body.

The preferred embodiment of the invention shown and described herein, is used in an operating system environment in which a technique for allocating stack frames in 16-bit code known as "tiling" has been implemented. In this environment, the 64K byte storage segments have been defined in a contiguous line of "tiles". This is the technique used for allocating 16-bit code storage in, for example, IBM's OS/2 operating system environment. However, the present invention can be applied to a memory that is not organised by tiling, as long as modifications for mapping addresses between 16 and 32-bit code in such environment are present. In the preferred embodiment, the tiled address space is exploited in such a way that the processor enters the 32-bit code from the 16-bit code by calling what it thinks is a 16-bit entry point. This is, however, an alias to the 32-bit flat code segment,but the prologue and epilogue generated by the compiler is encoded in the 32-bit function body with the 16-bit mode encodings so that the processor encounters an instruction stream acceptable to it even though it is running 32-bit code in 16-bit mode.

In processing the 32-bit function, the compiler identifies the function as having been called by 16-bit code by recognising a 16-bit far linkage compiler command. The compiler, which has been specially enhanced in accordance with the invention, automatically generates and inserts into the 32-bit code, as it is being processed, the prologue and epilogue code to implement the changes to the stack shown in FIGS. 2 and 3, and described below.

The steps implemented through the modified 32-bit code comprise a series of steps implemented as a prologue to permit the called 32-bit code to access the stack frame allocated by the 16-bit code (these steps are summarised in FIG. 2) and a series of steps implemented as an epilogue to permit the 16-bit calling function to re-access its allocated stack frame(s) on return from the 32-bit code.

On first access by the modified 32-bit code to the stack, the original values of the segment registers and base register used by the 16-bit code for accessing the stack (but incomprehensible to the 32-bit code), are preserved in a small area of the stack, so that these register values can be restored upon the 32-bit functions return.

The pointer with the stack address (the stack pointer) is then aligned to a 4 byte boundary at the beginning of the stack by converting the address to an even multiple of 4 bytes. This ensures optimal performance for stack references in the 32-bit code, since in this environment, unaligned references require twice as many cycles to execute at runtime as aligned references.

Also, since the different padding and datatype shapes in 32-bit code make a 16-bit parameter area in a stack unusable, it is necessary to rebuild the parameter list of the calling 16-bit function so that the data in the stack frames is accessable by 32-bit code.

The operating mode of the central processing unit (CPU) is then changed to 32-bit code format from the 16-bit code. This is done by utilising the 48-bit address in the flat code segment of a nearby label in the instruction stream being executed by the CPU. This 48-bit address can either be pushed onto the modified stack and a prefixed far return executed, or a jump can be executed to the same 48-bit address.

The stack pointer and sement are then converted to be 32-bit. The actual alteration of the 16-bit pointer format to 32-bit format is done through a straightforward mathematical conversion, replacing the segment number with the multiple of 64K bytes it represents, and adding to that multiple the offset within the stack frame, to produce a base linear value from the segmented value.

In addition, the data segment registers are set-up to point to the flat 32-bit data segments.

Once these steps of the prologue have been implemented, the 32-bit function can be implemented as a normal 32-bit function without the compiler having to generate any code altering the the body of the function.

When implementation of the 32-bit code function body is complete, and just prior to its return, the steps of the epilogue (illustrated in the flowchart of FIG. 3) are implemented to return to the 16-bit executing environment.

First, the return value emanating from the called 32-bit code, if the function has a return value, is converted from its 32-bit code form to a 16-bit code form compatible with the particular 16-bit linkage in use.

The original values of the 16-bit code registers are retrieved from where they were preserved in the prologue, and the original 16-bit code registers (including the stack pointer) restored. The original values of the data segment registers and base register are also retrieved and restored.

Finally, a prefixed far return is executed to change the operating mode of the CPU back to 16-bit code format and to return control to the original 16-bit code.

Although the foregoing invention has been particularly shown and described with reference to the preferred embodiment, as the invention is not dependant on programing language or operating system, it will be appreciated by those skilled in the art that modifications may be made without departing from the spirit of the invention.

What is claimed is:

1. A combination operable in conjunction with a digital computer system having a central processing unit (CPU) to provide a 32-bit function with access to a memory stack shared with at least one 16-bit code function, the combination comprising:

a 32-bit program means for causing the CPU to execute a 32-bit code function; and prologue means in the 32-bit program means responsive to a call from a 16-bit code function for:

building a parameter list in a memory stack in 32-bit form to allow the 32-bit code function to access data in the memory stack;

translating 16-bit register values in the memory stack into a form which is addressable by the 32-bit code;

changing the operating mode of the CPU to 32-bit form;

establishing additional 32-bit registers; and executing the 32-bit code.

2. The combination of claim 1, the prologue means further comprising means for preserving segment register values and base register values used by the 16-bit code in an area of memory stack.

3. The combination of claim 2, further comprising epilogue means for:

retrieving the values of the segment registers and the base register from the area of the memory stack and restoring values of the segment registers to 16-bit code values; and changing the operating mode of the CPU to 16-bit code format and returning control to the 16-bit code function.

4. The combination of claim 3, wherein the epilogue means further includes means for converting a return value from the 32-bit code to a 16-bit code form.

5. The combination of claim 1, wherein the stack includes a stack pointer, the prologue means further for aligning the stack pointer to a 4-byte boundary at the beginning of the stack by converting an address in the stack pointer to an even multiple of 4 bytes prior to building the parameter list.

6. In a computing environment, having a central processing unit (CPU) and including mapping means for mapping addresses between 16- and 32-bit code, a method for calling 32-bit code from a 16-bit code in a program, in which at least one 16-bit stack frame in a memory stack, is allocated to the 16-bit code, the method comprising the computer implemented steps of:

executing a program in the computing environment;

during execution of the program, executing function embodied in 16-bit code;

calling a function embodied in 32-bit code;

building a parameter list in the memory stack in 32-bit form to allow the 32 bit code access data in the stack frame;

translating 16-bit register values in the memory stack into a form which is addressable by the 32-bit code;

changing operating mode of the CPU to 32-bit form;

establishing all additional 32-bit registers; and, executing the 32-bit code.

7. A method, according to claim 6, further comprising the step of creating and maintaining a record of the original register values for said at least one 16-bit stack frame before performing the steps of building the parameter list and translating said 16-bit register values.

8. A method, according to claim 7, further comprising the step of reserving parameter values for 16-bit code in said at least one stack frame separately in the memory stack before building the parameter list.

9. A method, according to claim 6, wherein the operating mode of the CPU is changed to 32-bit code by executing a jump to a 48-bit address for 32-bit code, and subsequently executing a far return from said address.

10. A method, according to claim 9, further comprising the step of implementing a mapping of addresses from 16-bit to 32-bit format after changing the operating mode.

11. A method, according to claim 6, wherein the operating mode of the CPU is changed to 32-bite code by pushing onto the memory stack a 48-bit address for 32-bit code.

12. A method, according to claim 11 further comprising the step of implementing a mapping of addresses from 16-bit to 32-bit format after changing the operating mode.

13. A method, according to claim 6, further comprising the following steps implemented on completion of a function in 32-bit code in order to implement a transfer of control to 16-bit code:

converting a return value in the function in 32-bit code to 16-bit format;

converting the translated register values back to 16-bit format; and changing the operating mode of the CPU to 16-bit code.

14. A method, according to claim 13, wherein the step of converting the translated register values back to 16-bit format include establishing a 16-bit register environment.

15. A method, according to claim 6, wherein the step of translating the 16-bit register values to 32-bit format includes establishing a 32-bit segment register environment with the translated values.

16. A method, according to claim 6, further comprising the step of implementing a mapping of addresses from 16-bit to 32-bit format after changing the operating mode.

17. In a computing environment including means for mapping addresses between 16- and 32-bit code, a mechanism for enabling calls from a program in 16-bit code to a subroutine in 32-bit code, comprising:

a memory stack in which at least one stack frame is allocated to the program in 16-bit code;

a 32-bit compiler having a enhancement element for generating and imbedding in a 32-bit subroutine, first code to transfer control in a 16-bit environment to 32-bit code and second code for returning control to 16-bit code; and signal means for activating the enhancement element in the 32-bit compiler to generate the first code to transfer control and the second code to return control.

18. A mechanism, according to claim 17, further comprising means for implementing a 32-bit operating mode in said at least one stack frame.

19. A mechanism, according to claim 18, wherein the means for implementing a 32-bit operating mode comprises means for executing a jump to a 48-bit address for 32-bit code.

20. A mechanism, according to claim 18, wherein the means for implementing a 32-bit operating mode comprises means for pushing a 48-bit address for 32-bit code onto the memory stack.

21. A mechanism, according to claim 17, wherein the signal means comprise a 16-bit linkage in the 32-bit subroutine called by the 16-bit program.

22. A mechanism, according to claim 17, wherein the signal means comprise a 16-bit linkage in source code processed in the 32-bit compiler.

23. A combination operable in conjunction with a digital computer system having a central processing unit (CPU) for calling 32-bit code from a 16-bit code in a program executing on the digital computer system, said combination comprising a data storage medium operable in conjunction with a data storage system of the digital computer system, the data storage medium having resident thereon program means executable on the CPU for performing steps including:

during execution of a program in the digital computer system while the CPU is in a 16-bit operating mode, executing a function embodied in 16-bit code;

calling a function embodied in 32-bit code;

building a parameter list in a memory stack in 32-bit form to allow the 32bit code to access in the stack frame;

translating the 16-bit register values in the memory stack into a form which is addressable by the 32-bit code;

changing the operating mode of the CPU to 32-bit form;

establishing all additional 32-bit registers; and executing the 32-bit code.

24. The combination of claim 23, wherein the step of building a parameter list includes preserving segment register values and base register values used by the 16-bit code in an area of the memory stack.

25. The combination of claim 24, wherein the steps further include:

converting a return value from the 32-bit code to a 16-bit code form;

retreiving the values of the segment registers and the base register from the area of the stack and restoring values of the segment registers and the base register to 16-bit code values; and changing the operating mode of the CPU to 16-bit code format and returning control to the 16-bit code.

26. The combination of claim 23, wherein the stack includes a stack pointer, the steps further including, prior to building the parameter list, aligning the stack pointer to a four-byte memory address boundary at the beginning of the stack.

* * * * *

UNITED STATES PATENT AND TRADEMARK OFFICE
CERTIFICATE OF CORRECTION

PATENT NO.   :   5,490,256
DATED        :   February 6, 1996
INVENTOR(S)  :   Mooney et al It is certified that error appears in the above-indentified patent and that said Letters Patent is hereby corrected as shown below:

Column 6, line 14, insert --a-- between "executing" and "function".

Column 7, line 7, change "a" to --an--.

Signed and Sealed this

Twenty-third Day of July, 1996

*Attest:*

BRUCE LEHMAN

*Attesting Officer*      *Commissioner of Patents and Trademarks*